United States Patent
Nakayama et al.

(10) Patent No.: US 7,585,913 B2
(45) Date of Patent: Sep. 8, 2009

(54) RUBBER COMPOSITION AND TIRE USING THE SAME

(75) Inventors: Atsushi Nakayama, Kodaira (JP); Hiroshi Yamada, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 341 days.

(21) Appl. No.: 10/554,110

(22) PCT Filed: Apr. 19, 2004

(86) PCT No.: PCT/JP2004/005563

§ 371 (c)(1), (2), (4) Date: Oct. 21, 2005

(87) PCT Pub. No.: WO2004/094525

PCT Pub. Date: Nov. 4, 2004

(65) Prior Publication Data

US 2006/0199894 A1    Sep. 7, 2006

(30) Foreign Application Priority Data

Apr. 22, 2003    (JP) ............................. 2003-117078

(51) Int. Cl.
C08K 3/04    (2006.01)
(52) U.S. Cl. ....................... 524/495; 524/496
(58) Field of Classification Search ................. 524/495, 524/496
See application file for complete search history.

(56) References Cited

U.S. PATENT DOCUMENTS 4,550,135 A * 10/1985 Iwama et al. ................ 524/495

FOREIGN PATENT DOCUMENTS

| EP | 0 003 837 A1 | 9/1979 |
| EP | 0 396 348 A1 | 11/1990 |
| JP | 61-283635 A | 12/1986 |
| JP | 10-36703 A | 2/1998 |
| JP | 10036703 A * | 2/1998 |
| JP | 10053723 A | 2/1998 |
| JP | 2001-247721 A | 9/2001 |

OTHER PUBLICATIONS

SU 1700028A1, Derwent Abstract, Dec. 23, 1987.*
JP 10036703 A, Machine translation, Feb. 10, 1998.*

* cited by examiner

*Primary Examiner*—Peter D Mulcahy
(74) *Attorney, Agent, or Firm*—Sughrue Mion, PLLC

(57) ABSTRACT

This invention relates to a rubber composition possessing high wear resistance and low heat buildup, and more particularly to a rubber composition comprising 100 parts by mass of a diene polymer and 20-250 parts by mass of a carbon black as a filler, characterized in that the carbon black has a dibutyl phthalate (DBP) absorption number of 40-180 cm$^3$/100 g, a nitrogen adsorption specific surface area ($N_2$SA) of 40-300 m$^2$/g, a tint strength (TINT) of 50-150% and a light transmittance of toluene extract of not less than 90% and a relation between the nitrogen adsorption specific surface area and the light transmittance of toluene extract satisfies the following equation (I):

$$0.0283 \times A \times (100-B) \leq 40 \quad (I)$$

(wherein A is a nitrogen adsorption specific surface area and B is a light transmittance of toluene extract).

12 Claims, No Drawings

RUBBER COMPOSITION AND TIRE USING THE SAME

TECHNICAL FIELD

This invention relates to a rubber composition and a tire using the same, and more particularly to a rubber composition for a tire tread having a high wear resistance and a low heat buildup.

BACKGROUND ART

Heretofore, a carbon black is compounded into rubber as a filler, and the rubber is reinforced by the compounding of the carbon black to improve physical properties of rubber such as wear resistance, tensile strength and the like. In general, a carbon black having a high reinforcing property can be obtained by controlling a surface nature of the carbon black, but a light transmittance of toluene extract is lowered at the same time to increase a tar component adhered onto the surface of the carbon black and hence this tar component obstructs the reinforcing property inherent to the carbon black. Therefore, there is naturally a limit for improving the reinforcing property of the carbon black (see JP-A-2000-53883, JP-A-10-36703 and JP-A-9-40883).

Also, rubber compositions compounded with the carbon black having a high reinforcing property are excellent in the wear resistance and the like, so that they are suitable as a tread rubber for a tire. In recent years, however, the rubber composition used in the tread rubber is required to be excellent in the low heat buildup in addition to the wear resistance from a demand of reducing a fuel consumption of the tire. These two performances are usually conflicting with each other, so that the establishment thereof is made first possible by improving the filler such as carbon black or the like.

DISCLOSURE OF THE INVENTION

It is, therefore, an object of the invention to solve the problems of the conventional technique and to provide a rubber composition possessing a high wear resistance and a low heat buildup. Also, it is another object of the invention to provide a tire having excellent wear resistance and low heat buildup in which the above rubber composition is applied to a tread.

The inventors have made various studies for achieving the above objects and found that when a diene polymer is compounded with a carbon black to form a rubber composition, the diene polymer is highly reinforced by using a carbon black being less in a tar component existing on its surface, particularly polycyclic aromatic component, whereby high fracture strength and wear resistance are obtained in the rubber composition and further heat buildup of the rubber composition is suppressed to a low level, and as a result, the invention has been accomplished.

That is, the rubber composition according to the invention is a rubber composition comprising 100 parts by mass of a diene polymer and 20-250 parts by mass of a carbon black as a filler, characterized in that the carbon black has a dibutyl phthalate (DBP) absorption number of 40-180 cm$^3$/100 g, a nitrogen adsorption specific surface area (N$_2$SA) of 40-300 m$^2$/g, a tint strength (TINT) of 50-150% and a light transmittance of toluene extract of not less than 90% and a relation between the nitrogen adsorption specific surface area and the light transmittance of toluene extract satisfies the following equation (I):

$$0.0283 \times A \times (100-B) \leq 40 \quad (I)$$

(wherein A is a nitrogen adsorption specific surface area and B is a light transmittance of toluene extract).

In a preferable embodiment of the rubber composition according to the invention, the relation between the nitrogen adsorption specific surface area and the light transmittance of toluene extract satisfies the following equation (II):

$$0.0283 \times A \times (100-B) \leq 20 \quad (II)$$

(wherein A and B are the same as mentioned above).

At this moment, it is further preferable that the relation between the nitrogen adsorption specific surface area and the light transmittance of toluene extract satisfies the following equation (III):

$$0.0283 \times A \times (100-B) \leq 8 \quad (III)$$

(wherein A and B are the same as mentioned above).

In another preferable embodiment of the rubber composition according to the invention, the carbon black has a maximum ultraviolet (UV) absorbance at 330-340 nm of not more than 0.020 and a maximum ultraviolet (UV) absorbance at 260-280 nm of not more than 0.020.

In the other preferable embodiment of the rubber composition according to the invention, the carbon black has a weight reduction ratio at 400-530° C. of not more than 0.20%.

In a further preferable embodiment of the rubber composition according to the invention, the carbon black has an extraction ratio with dichloromethane of not more than 0.12%.

In a still further preferable embodiment of the rubber composition according to the invention, the carbon black has a hydrogen emitting ratio at 2000° C. of not less than 0.15%. At this moment, the carbon black is preferable to have a hydrogen emitting ratio at 2000° C. of not less than 0.18%, more preferably not less than 0.23%.

Further, the tire according to the invention is characterized by using the above rubber composition in a tread.

BEST MODE FOR CARRYING OUT THE INVENTION

The invention will be described in detail below. The rubber composition according to the invention comprises 20-250 parts by mass of a carbon black as a filler based on 100 parts by mass of a diene polymer, in which the carbon black has a dibutyl phthalate (DBP) absorption number of 40-180 cm$^3$/100 g, a nitrogen adsorption specific surface area (N$_2$SA) of 40-300 m$^2$/g, a tint strength (TINT) of 50-150% and a light transmittance of toluene extract of not less than 90% and a relation between the nitrogen adsorption specific surface area and the light transmittance of toluene extract satisfies the above equation (I). In this carbon black, the DBP absorption number, N$_2$SA and TINT satisfy the above ranges and the light transmittance of toluene extract is not less than 90%, so that the tar component existing on the surface is sufficiently small and the composite between the carbon black and the rubber component is efficiently caused, whereby the wear resistance of the rubber composition can be considerably improved, and at the same time, the heat buildup of the rubber composition can be lowered.

The carbon black used in the rubber composition according to the invention is preferable to have a dibutyl phthalate (DBP) absorption number of 40-180 cm$^3$/100 g, preferably 70-170 cm$^3$/100 g. When the DBP absorption number of the carbon black is less than 40 cm$^3$/100 g, the minimum tensile stress required as a rubber composition for the tire can not be developed, while when it exceeds 180 cm$^3$/100 g, a minimum elongation required can not be ensured.

The carbon black used in the rubber composition according to the invention has a nitrogen adsorption specific surface area ($N_2SA$) of 40-300 m$^2$/g, preferably 70-250 m$^2$/g, more preferably 70-170 m$^2$/g. When the nitrogen adsorption specific surface area of the carbon black is less than 40 m$^2$/g, the minimum strength (tensile strength) required as a rubber composition for the tire can not be developed, while when it exceeds 300 m$^2$/g, the dispersibility in the rubber composition can not be sufficiently ensured and hence the wear resistance and the like of the rubber composition are deteriorated.

The carbon black used in the rubber composition according to the invention has a tint strength (TINT) of 50-150%, preferably 90-145%. When the tint strength of the carbon black is less than 50%, the strength and wear resistance durable in the tire when the rubber composition is applied to the tread can not be developed, while when it exceeds 150%, the viscosity of rubber remarkably rises and it is difficult to provide the rubber composition.

The carbon black used in the rubber composition according to the invention has a light transmittance of toluene extract of not less than 90%, preferably not less than 95%. When the light transmittance of toluene extract in the carbon black is less than 90%, the tar component existing on the surface of the carbon black, particularly aromatic component becomes large, and hence the rubber composition can not be sufficiently reinforced and the wear resistance and the like of the rubber composition lower.

As to the carbon black used in the rubber composition according to the invention, the nitrogen adsorption specific surface area and the light transmittance of toluene extract satisfy the relation of the equation (I), preferably the relation of the equation (II), more preferably the relation of the equation (III) as an absolute value. When a left side in the equations (I), (II) and (III) exceeds 40, the tar component becomes large on the surface of the carbon black, and hence the rubber composition can not be sufficiently reinforced and the wear resistance lowers.

The carbon black used in the rubber composition according to the invention is preferable to have a maximum ultraviolet (UV) absorbance at 330-340 nm of not more than 0.020 and a maximum ultraviolet (UV) absorbance at 260-280 nm of not more than 0.020. As the maximum UV absorbances at 330-340 nm and 260-280 nm become small, the aromatic component existing on the surface of the carbon black become less. Therefore, by using the carbon black having the maximum UV absorbances at 330-340 nm and 260-280 nm of not more than 0.020 can be given a high reinforcing property to the rubber composition to thereby improve the wear resistance and the like.

The carbon black used in the rubber composition according to the invention is preferable to have a weight reduction ratio at 400-530° C. of not more than 0.20%. As the weight reduction ratio at 400-530° C. becomes small, the aromatic component existing on the surface of the carbon black become less. Therefore, by using the carbon black having the weight reduction ratio at 400-530° C. of not more than 0.20% can be given a high reinforcing property to the rubber composition to thereby improve the wear resistance and the like.

The carbon black used in the rubber composition according to the invention is preferable to have an extraction ratio with dichloromethane of not more than 0.12%. As the extraction ratio with dichloromethane becomes small, the aromatic component existing on the surface of the carbon black become less. Therefore, by using the carbon black having the extraction ratio with dichloromethane of not more than 0.12% can be given a high reinforcing property to the rubber composition to thereby improve the wear resistance and the like.

As to the carbon black used in the rubber composition according to the invention, the hydrogen emitting ratio at 2000° C. is preferably not less than 0.15%, more preferably not less than 0.18%, particularly not less than 0.23%. At this moment, the hydrogen emitting ratio at 2000° C. means a ratio of hydrogen quantity produced when the carbon black is heated at 2000° C. for 15 minutes to the mass of the carbon black. When the carbon black having a hydrogen emitting ratio at 2000° C. of less than 0.15% is used in the rubber composition, the wear resistance of the rubber composition lowers, and the heat buildup of the rubber composition undesirably becomes large.

The rubber composition according to the invention contains 20-250 parts by mass of the carbon black as a filler based on 100 parts by mass of the diene polymer as a rubber component. When the amount of the carbon black is less than 20 parts by mass, the rigidity of the rubber is low and the wear resistance is insufficient, while when it exceeds 250 parts by mass, the rubber composition becomes too hard, and the wear resistance rather lowers and further the processability of the rubber composition is extremely deteriorated.

As the diene polymer used as a rubber component in the rubber composition according to the invention are mentioned natural rubber (NR), styrene-butadiene copolymer rubber (SBR), styrene-isoprene copolymer rubber (SIR), polyisoprene rubber (IR), poly-butadiene rubber (BR) and the like. They may be used alone or in a combination of two or more.

In addition to the above carbon black and the diene polymer, the rubber composition may be properly compounded with additives usually used in the rubber industry such as a filler other than carbon black, a vulcanizing agent, a vulcanization accelerator, an antioxidant, a scorch retarder, a softening agent, zinc oxide, stearic acid, a silane coupling agent and the like within a scope not damaging the object of the invention. As these additives can be preferably used commercially available ones. Moreover, the rubber composition can be produced by compounding the diene polymer with the carbon black and, if necessary, various additives properly selected, and milling them and warming up and extruding and the like.

The tire according to the invention is characterized by using the above rubber composition in the tread. Since the rubber composition is excellent in the wear resistance and low heat buildup, the tire according to the invention is excellent in the wear resistance and low fuel consumption.

The following examples are given in illustration of the invention and are not intended as limitations thereof.

EXAMPLES (Production Method of Carbon Black)

In a furnace for the production of carbon black are produced carbon blacks having various properties by properly adjusting an air-introducing condition, a starting oil-introducing condition, and a position and an amount of water introduced for the stop of the reaction and a subsequent temperature, and if necessary, introducing a compound such as water, air or the like into the furnace at a subsequent step. Furthermore, the carbon blacks having various properties are obtained by properly adjusting a drying temperature (150-250° C.) of the carbon black after the granulation, if necessary.

With respect to the thus obtained carbon blacks, the dibutyl phthalate (DBP) absorption number according to ASTM D2414-88 (JIS K6217-97), nitrogen adsorption specific surface area ($N_2SA$) according to ASTM D3037-88, tint strength (TINT) according to ASTM D3265-88 and light transmittance of toluene extract according to JIS K6218-97 are measured, respectively, and further the UV absorbance, weight reduction ratio, extraction ratio with dichloromethane and hydrogen emitting ratio at 2000° C. are measured by the following methods. The results are shown in Tables 2 and 3.

(1) UV Absorbance

① A carbon black sample is dried in an isothermal drier at 105° C. for 1 hour and cooled to room temperature in a desiccator.

② 3.00 g of the sample is weight in an Erienmeyer flask of 100 mL with a co-plug.

③ To the flask is added 30 mL of cyclohexane, which is plugged and violently oscillated for 60 seconds and then left to stand at room temperature for 6 hours.

④ The mixed solution is filtered through a filtrating paper dried at 105° C., and a filtrate is placed into a quartz cell for the UV measurement.

⑤ A solution obtained by carrying out the above operations ③-④ without using the carbon black sample is placed into two quartz cells for the UV measurement, and one of these cells is set to a reference-side light path of a UV measuring device and the other is set to a sample-side light path, and they are adjusted (corrected) at 0-100%.

⑥ With respect to the filtrate obtained in the item ④, maximum light absorbance at 330-340 nm and 260-280 nm are measured.

(2) Weight Reduction Ratio

① A carbon black sample is dried in an isothermal drier at 105° C. for 1 hour and cooled to room temperature in a desiccator.

② About 10 mg of the sample is weighed on a metal pan for the TGA measurement and subjected to TGA (thermal weight analysis) under a stream of nitrogen gas.

③ The temperature of the sample is raised from 40° C. to 600° C. at a rate of 10° C./min to measure a weight reduction ratio from 400° C. to 530° C. based on the initial weight ②.

(3) Extraction Ratio with Dichloromethane

① About 15 g of a carbon black sample is weighed and placed in a cylindrical filtering paper.

② It is refluxed by heating in a Soxhlet extractor using dichloromethane as an extraction solvent for 30 hours.

③ The extract is dried through evaporation to measure a mass of the residue to thereby determine a mass percentage (ratio of component extracted with dichloromethane).

(4) Hydrogen Emitting Ratio at 2000° C.

① A carbon black sample is dried in an isothermal drier at 105° C. for 1 hour and cooled to room temperature in a desiccator.

② About 10 g of the sample is weighed in a tubular vessel made of tin, which is closed by pressing.

③ An amount of hydrogen produced when it is heated in a hydrogen analyzing device (EMGA621W, made by Horiba Seisakusho) at 2000° C. under a steam of argon gas for 15 minutes is measured to determine a mass percentage.

A rubber composition using the above carbon black according to a compounding recipe shown in Table 1 (amount of sulfur compounded is shown in Table 2) is milled in a Banbury mixer and further vulcanized in a pressure type vulcanizing apparatus at 145° C. for 30 minutes to obtain a vulcanized rubber. With respect to the resulting vulcanized rubber, the hardness according to JIS K6253-1997, the elongation at break, tensile strength and tensile stress at 300% elongation according to JIS K6251-1993 and the rebound resilience according to JIS K6255-1996 are measured, respectively, and further the wear resistance is evaluated by the following method. These results are shown in Tables 2 and 3. Moreover, the rebound resilience is represented by an index on the basis that the rebound resilience of a test specimen as a standard for comparison is 100, in which the larger the index value, the higher the rebound resilience and the better the low heat buildup.

(5) Wear Resistance of Vulcanized Rubber

A wear loss quantity is measured by using a Lambourn abrasion tester and then an index of wear resistance is calculated according to the following equation. Moreover, the larger the index value, the better the wear resistance.

Equation: index of wear resistance=wear loss quantity of a test specimen as a standard for comparison/wear loss quantity of each rubber test specimen×100

Furthermore, tires for truck and tires for passenger car are prepared by applying the rubber composition to a tread, and the wear resistance and heat buildup thereof are evaluated by the following methods. These results are shown in Tables 2 and 3.

(6) Wear Resistance of Tire

After the tire is mounted onto a truck or a passenger car and run over a distance of 20000 km for the passenger car tire or 4000 km for the truck tire, a residual amount of the groove, and the wear resistance is represented by an index on the basis that a reciprocate of the residual amount of the groove in the tire as a standard for the comparison is 100. The larger the index value, the better the wear resistance.

(7) Heat Buildup of Tire

After the tire is rotated on a steel drum under a constant load for a constant time, a temperature of a tire tread portion is measured, and the heat buildup is represented by an index on the basis that the a reciprocate of the temperature in the tread portion of the tire as a standard for the comparison is 100. The larger the index value, the better the low heat buildup.

TABLE 1

| | | For passenger car | For truck |
|---|---|---|---|
| Compounding recipe of rubber composition | NR (RSS#3) | — | 50 |
| | cis-BR *1 | — | 50 |
| | SBR *2 | 100 | — |
| | Carbon black | 50 | 50 |
| | Aromatic oil *3 | 10 | — |
| | Antioxidant 6PPD *4 | 1 | 1 |
| | Stearic acid | 2 | 2 |
| | Zinc oxide | 2.5 | 3 |
| | Vulcanization accelerator BBS *5 | 0.6 | 0.8 |
| | Vulcanization accelerator DPG *6 | 0.6 | 0.2 |
| | Vulcanization accelerator DM *7 | 0.6 | — |
| | Sulfur | variable | variable |
| Tire size | | 185/60R14 | 11.0R22.5 |

In Table 1,
*1 is BR01 made by JSR Corporation,
*2 is #1500 made by JSR Corporation,
*3 is AH-58 made by Idemitsu Kosan Co., Ltd.,
*4 is N-(1,3-dimethylbutyl)-N'-phenyl-p-phenylene diamine,
*5 is N-t-butyl-2-benzothiazole sulfenamide,
*6 is diphenyl guanidine and
*7 is dibenzothiazyl disulfide.

In Table 1, *1 is BR01 made by JSR Corporation, *2 is #1500 made by JSR Corporation, *3 is AH-58 made by Idemitsu Kosan Co., Ltd., *4 is N-(1,3-dimethylbutyl)-N'-phenyl-p-phenylene diamine, *5 is N-t-butyl-2-benzothiazole sulfenamide, *6 is diphenyl guanidine and *7 is dibenzothiazyl disulfide.

TABLE 2

(a)

|  |  |  |  | Example 1 | Example 2 | Example 3 | Example 4 | Example 5 | Example 6 |
|---|---|---|---|---|---|---|---|---|---|
| Production conditions of carbon black | Air introducing conditions | total amount of air introduced | (kg/h) | 1490 | 1488 | 1493 | 1485 | 1490 | 1493 |
|  |  | preheating temperature | (° C.) | 600 | 603 | 605 | 602 | 600 | 602 |
|  |  | amount of fuel introduced | (kg/h) | 75 | 74 | 75 | 73 | 75 | 75 |
|  | Raw oil introducing conditions | amount introduced | (kg/h) | 355 | 352 | 357 | 365 | 355 | 354 |
|  |  | preheating temperature | (° C.) | 190 | 195 | 197 | 187 | 198 | 195 |
|  | Cooling medium introducing conditions | residual time | (millisecond) | 2.7 | 3.7 | 7.1 | 7.7 | 7.1 | 7.1 |
|  |  | amount of cooling water at first stage | (L/h) | 291 | 295 | 289 | 427 | 305 | 304 |
|  |  | amount of cooling water at second stage | (L/h) | 141 | 145 | 143 | — | — | 130 |
|  | Drying temperature of carbon black |  | (° C.) | 197 | 200 | 198 | 195 | 230 | 197 |
| Properties of carbon black | DBP absorption number |  | (cm$^3$/100 g) | 128 | 128 | 127 | 128 | 126 | 126 |
|  | N$_2$SA (BET surface area) |  | (m$^2$/g) | 131 | 131 | 130 | 130 | 132 | 132 |
|  | TINT |  | (%) | 132 | 132 | 132 | 132 | 133 | 133 |
|  | Light transmittance of toluene extract |  | (%) | 99.2 | 98.8 | 99.1 | 99.2 | 96.1 | 95.8 |
|  | 0.0283 × A × (100 − B) |  | — | 3.0 | 4.4 | 3.3 | 2.9 | 14.6 | 15.7 |
|  | UV absorbance (330-340 nm) |  | (%) | <0.001 | <0.001 | <0.001 | 0.001 | 0.005 | 0.030 |
|  | UV absorbance (270-280 nm) |  | (%) | <0.001 | <0.001 | 0.001 | 0.002 | 0.006 | 0.030 |
|  | Weight reduction ratio (400-530° C.) |  | (%) | 0.01 | 0.01 | 0.01 | 0.01 | 0.11 | 0.11 |
|  | Extraction ratio with dichloromethane |  | (%) | <0.01 | <0.01 | <0.01 | <0.01 | 0.05 | 0.05 |
|  | Hydrogen emitting ratio (2000° C.) |  | (%) | 0.25 | 0.22 | 0.16 | 0.14 | 0.17 | 0.17 |
| Compounding recipe and tire size |  |  |  | for truck |  |  |  |  |  |
| Amount of sulfur compounded *2-1 |  |  | (part by mass) | 1.5 | 1.5 | 1.5 | 1.5 | 1.5 | 1.5 |
| Properties of vulcanized rubber | Hardness |  | — | 67 | 67 | 66 | 67 | 67 | 67 |
|  | Elongation at break |  | (%) | 560 | 560 | 570 | 580 | 580 | 580 |
|  | Tensile strength |  | (MPa) | 31.0 | 30.8 | 30.4 | 30.0 | 29.1 | 28.8 |
|  | Tensile stress at 300% elongation |  | (MPa) | 14.4 | 14.2 | 14.1 | 13.7 | 14.7 | 14.5 |
|  | Lambourn wear resistance |  | (index) | 128 | 122 | 117 | 108 | 113 | 109 |
|  | Rebound resilience |  | (index) | 108 | 107 | 105 | 103 | 105 | 10.5 |
| Evaluation | Wear resistance of tire |  | (index) | 122 | 118 | 114 | — | — | — |
|  | Heart buildup of tire |  | (index) | 107 | 106 | 106 | — | — | — |

(b)

|  |  |  |  | Example 7 | Example 8 | Example 9 | Example 10 | Example 11 | Example 12 |
|---|---|---|---|---|---|---|---|---|---|
| Production conditions of carbon black | Air introducing conditions | total amount of air introduced | (kg/h) | 1495 | 1495 | 1500 | 1502 | 1500 | 1490 |
|  |  | preheating temperature | (° C.) | 605 | 603 | 605 | 607 | 605 | 605 |
|  |  | amount of fuel introduced | (kg/h) | 75 | 75 | 77 | 77 | 77 | 75 |
|  | Raw oil introducing conditions | amount introduced | (kg/h) | 360 | 350 | 363 | 362 | 360 | 345 |
|  |  | preheating temperature | (° C.) | 193 | 198 | 196 | 195 | 198 | 190 |
|  | Cooling medium introducing conditions | residual time | (millisecond) | 5.7 | 7.1 | 5.7 | 5.7 | 5.7 | 3.7 |
|  |  | amount of cooling water at first stage | (L/h) | 421 | 332 | 425 | 423 | 428 | 385 |
|  |  | amount of cooling water at second stage | (L/h) | — | 113 | — | — | — | 102 |
|  | Drying temperature of carbon black |  | (° C.) | 192 | 197 | 255 | 195 | 235 | 201 |
| Properties of carbon black | DBP absorption number |  | (cm$^3$/100 g) | 126 | 126 | 126 | 126 | 126 | 126 |
|  | N$_2$SA (BET surface area) |  | (m$^2$/g) | 132 | 132 | 132 | 132 | 132 | 129 |
|  | TINT |  | (%) | 133 | 133 | 133 | 133 | 133 | 130 |
|  | Light transmittance of toluene extract |  | (%) | 95.5 | 93.2 | 93.5 | 92.7 | 92.8 | 90.5 |
|  | 0.0283 × A × (100 − B) |  | — | 16.8 | 25.4 | 24.3 | 27.3 | 26.9 | 34.7 |
|  | UV absorbance (330-340 nm) |  | (%) | 0.005 | 0.011 | 0.010 | 0.015 | 0.016 | 0.016 |
|  | UV absorbance (270-280 nm) |  | (%) | 0.005 | 0.012 | 0.012 | 0.016 | 0.017 | 0.017 |
|  | Weight reduction ratio (400-530° C.) |  | (%) | 0.11 | 0.18 | 0.23 | 0.18 | 0.18 | 0.22 |
|  | Extraction ratio with dichloromethane |  | (%) | 0.05 | 0.05 | 0.05 | 0.13 | 0.05 | 0.11 |
|  | Hydrogen emitting ratio (2000° C.) |  | (%) | 0.13 | 0.16 | 0.16 | 0.16 | 0.17 | 0.23 |
| Compounding recipe and tire size |  |  |  | for truck |  |  |  |  |  |
| Amount of sulfur compounded *2-1 |  |  | (part by mass) | 1.6 | 1.6 | 1.6 | 1.6 | 1.6 | 1.4 |
| Properties of vulcanized rubber | Hardness |  | — | 67 | 67 | 67 | 67 | 67 | 68 |
|  | Elongation at break |  | (%) | 560 | 560 | 550 | 550 | 540 | 550 |
|  | Tensile strength |  | (MPa) | 28.6 | 29.0 | 28.6 | 28.5 | 28.0 | 29.1 |
|  | Tensile stress at 300% elongation |  | (MPa) | 14.6 | 14.8 | 14.8 | 14.8 | 14.8 | 14.8 |
|  | Lambourn wear resistance |  | (index) | 106 | 111 | 105 | 106 | 109 | 110 |
|  | Rebound resilience |  | (index) | 105 | 106 | 106 | 106 | 106 | 105 |
| Evaluation | Wear resistance of tire |  | (index) | — | — | — | — | — | — |
|  | Heart buildup of tire |  | (index) | — | — | — | — | — | — |

*2-1 amount of sulfur compounded per 100 parts by mass of rubber component

TABLE 3

|  |  |  |  | Comparative Example 1 | Comparative Example 2 | Comparative Example 3 | Comparative Example 4 |
|---|---|---|---|---|---|---|---|
| Production conditions of carbon black | Air introducing conditions | total amount of air introduced | (kg/h) | 1490 | 1500 | 1510 | 1498 |
|  |  | preheating temperature | (° C.) | 600 | 602 | 604 | 608 |
|  |  | amount of fuel introduced | (kg/h) | 75 | 77 | 78 | 75 |
|  | Raw oil introducing conditions | amount introduced | (kg/h) | 355 | 352 | 350 | 345 |
|  |  | preheating temperature | (° C.) | 190 | 195 | 196 | 197 |
|  | Cooling medium introducing conditions | residual time | (millisecond) | 3.7 | 3.7 | 2.7 | 1.8 |
|  |  | amount of cooling water at first stage | (L/h) | 496 | 498 | 502 | 498 |
|  |  | amount of cooling water at second stage | (L/h) | — | — | — | — |
|  | Drying temperature of carbon black |  | (° C.) | 198 | 211 | 195 | 200 |
| Properties of carbon black | DBP absorption number |  | (cm³/100 g) | 127 | 127 | 129 | 127 |
|  | $N_2SA$ (BET surface area) |  | (m²/g) | 129 | 130 | 132 | 130 |
|  | TINT |  | (%) | 132 | 133 | 132 | 132 |
|  | Light transmittance of toluene extract |  | (%) | 88 | 86.9 | 65 | 40 |
|  | 0.0283 × A × (100 − B) |  | — | 43.8 | 51.5 | 130.7 | 220.7 |
|  | UV absorbance (330-340 nm) |  | (%) | 0.080 | 0.130 | 0.180 | 0.220 |
|  | UV absorbance (270-280 nm) |  | (%) | 0.100 | 0.140 | 0.190 | 0.250 |
|  | Weight reduction ratio (400-530° C.) |  | (%) | 0.22 | 0.21 | 0.38 | 0.42 |
|  | Extraction ratio with dichloromethane |  | (%) | 0.10 | 0.13 | 0.22 | 0.28 |
|  | Hydrogen emitting ratio (2000° C.) |  | (%) | 0.17 | 0.17 | 0.22 | 0.28 |
| Compounding recipe and tire size |  |  |  | for truck | | | |
| Amount of sulfur compounded *3-1 |  |  | (part by mass) | 1.5 | 1.5 | 1.4 | 1.3 |
| Properties of vulcanized rubber | Hardness |  | — | 66 | 64 | 67 | 67 |
|  | Elongation at break |  | (%) | 520 | 480 | 450 | 430 |
|  | Tensile strength |  | (MPa) | 26.2 | 25.6 | 22.9 | 21.2 |
|  | Tensile stress at 300% elongation |  | (MPa) | 14.4 | 13.8 | 14.7 | 14.6 |
|  | Lambourn wear resistance |  | (index) | 101 | 100 | 90 | 79 |
|  | Rebound resilience |  | (index) | 98 | 100 | 92 | 86 |
| Evaluation | Wear resistance of tire |  | (index) | — | 100 | — | — |
|  | Heart buildup of tire |  | (index) | — | 100 | — | — |

|  |  |  |  | Example 13 | Comparative Example 5 | Example 14 | Comparative Example 6 |
|---|---|---|---|---|---|---|---|
| Production conditions of carbon black | Air introducing conditions | total amount of air introduced | (kg/h) | 1492 | 1488 | 1100 | 1150 |
|  |  | preheating temperature | (° C.) | 603 | 602 | 598 | 597 |
|  |  | amount of fuel introduced | (kg/h) | 75 | 74 | 50 | 52 |
|  | Raw oil introducing conditions | amount introduced | (kg/h) | 365 | 342 | 380 | 370 |
|  |  | preheating temperature | (° C.) | 196 | 198 | 185 | 187 |
|  | Cooling medium introducing conditions | residual time | (millisecond) | 4.7 | 0.77 | 78 | 41 |
|  |  | amount of cooling water at first stage | (L/h) | 281 | 486 | 376 | 380 |
|  |  | amount of cooling water at second stage | (L/h) | 139 | — | — | — |
|  | Drying temperature of carbon black |  | (° C.) | 195 | 201 | 202 | 205 |
| Properties of carbon black | DBP absorption number |  | (cm³/100 g) | 125 | 126 | 114 | 112 |
|  | $N_2SA$ (BET surface area) |  | (m²/g) | 126 | 124 | 71 | 73 |
|  | TINT |  | (%) | 124 | 123 | 102 | 104 |
|  | Light transmittance of toluene extract |  | (%) | 98 | 55 | 99 | 50 |
|  | 0.0283 × A × (100 − B) |  | — | 7.1 | 157.9 | 2.0 | 103.3 |
|  | UV absorbance (330-340 nm) |  | (%) | 0.005 | 0.190 | 0.002 | 0.210 |
|  | UV absorbance (270-280 nm) |  | (%) | 0.006 | 0.210 | 0.003 | 0.230 |
|  | Weight reduction ratio (400-530° C.) |  | (%) | 0.05 | 0.32 | 0.08 | 0.34 |
|  | Extraction ratio with dichloromethane |  | (%) | 0.10 | 0.22 | 0.11 | 0.25 |
|  | Hydrogen emitting ratio (2000° C.) |  | (%) | 0.18 | 0.27 | 0.24 | 0.28 |
| Compounding recipe and tire size |  |  |  | for truck | | for passenger car | |
| Amount of sulfur compounded *3-1 |  |  | (part by mass) | 1.5 | 1.4 | 1.5 | 1.4 |
| Properties of vulcanized rubber | Hardness |  | — | 63 | 62 | 58 | 57 |
|  | Elongation at break |  | (%) | 550 | 460 | 580 | 510 |
|  | Tensile strength |  | (MPa) | 29.1 | 27.0 | 23.2 | 20.8 |
|  | Tensile stress at 300% elongation |  | (MPa) | 13.6 | 13.2 | 12.1 | 12.1 |
|  | Lambourn wear resistance |  | (index) | 114 | 100 | 116 | 100 |
|  | Rebound resilience |  | (index) | 106 | 100 | 107 | 100 |
| Evaluation | Wear resistance of tire |  | (index) | 106 | 100 | 109 | 100 |
|  | Heart buildup of tire |  | (index) | 105 | 100 | 107 | 100 |

*3-1 amount of sulfur compounded per 100 parts by mass of rubber

In Tables 2 and 3, Examples 1-12 and Comparative Examples 1, 3 and 4 are compared with the vulcanized rubber and tire of Comparative Example 2 as a standard, and Example 13 is compared with the vulcanized rubber and tire of Comparative Example 5 as a standard, and Example 14 is compared with the vulcanized rubber and tire of Comparative Example 6 as a standard.

As seen from Tables 2 and 3, the vulcanized rubbers of the examples are high in the Lambourn wear resistance and rebound resilience, and the tires using such rubber compositions are excellent in the wear resistance and low heat buildup. On the other hand, the vulcanized rubbers of the comparative examples compounded with the carbon black not satisfying the properties defined in the invention are low in the Lambourn wear resistance and rebound resilience as compared with the vulcanized rubbers of the examples, and the tires of the comparative examples using these rubber compositions are poor in the wear resistance and low heat buildup as compared with the tires of the examples.

INDUSTRIAL APPLICABILITY

According to the invention, by using a carbon black having particular properties and a small tar component in a rubber composition compounded with the carbon black can be provided a rubber composition having a high strength at break and excellent wear resistance and low heat buildup. Also, there can be provided a tire using such a rubber composition in a tread and having excellent wear resistance and low fuel consumption.

The invention claimed is:

1. A rubber composition comprising 100 parts by mass of a diene polymer and 20-250 parts by mass of a carbon black as a filler, characterized in that the carbon black has a dibutylphthalate (DBP) absorption number of 40-180 cm$^3$/100 g, a nitrogen adsorption specific surface area ($N_2SA$) of 40-300 m$^2$/g, a tint strength (TINT) of 50-150%, a light transmittance of toluene extract of not less than 90% and a hydrogen emitting ratio at 2000° C. of not less than 0.18% and a relation between the nitrogen adsorption specific surface area and the light transmittance of toluene extract satisfies the following equation (II):

$$0.0283 \times A \times (100-B) \leq 20 \quad (II)$$

(wherein A is a nitrogen adsorption specific surface area and B is a light transmittance of toluene extract).

2. A rubber composition according to claim 1, wherein the relation between the nitrogen adsorption specific surface area and the light transmittance of toluene extract satisfies the following equation (III):

$$0.0283 \times A \times (100-B) \leq 8 \quad (III)$$

(wherein A and B are the same as mentioned above).

3. A rubber composition according to claim 1, wherein the carbon black has a maximum ultraviolet (UV) absorbance at 330-340 nm of not more than 0.020 and a maximum ultraviolet (UV) absorbance at 260-280 nm of not more than 0.020.

4. A rubber composition according to claim 1, wherein the carbon black has a weight reduction ratio at 400-530° C. of not more than 0.20%.

5. A rubber composition according to claim 1, wherein the carbon black has an extraction ratio with dichloromethane of not more than 0.12%.

6. A rubber composition according to claim 1, wherein the carbon black has a hydrogen emitting ratio of not less than 0.23%.

7. A tire characterized by using a rubber composition as claimed in claim 1 in a tread.

8. A tire characterized by using a rubber composition as claimed in claim 2 in a tread.

9. A tire characterized by using a rubber composition as claimed in claim 3 in a tread.

10. A tire characterized by using a rubber composition as claimed in claim 4 in a tread.

11. A tire characterized by using a rubber composition as claimed in claim 5 in a tread.

12. A tire characterized by using a rubber composition as claimed in claim 6 in a tread.

* * * * *